United States Patent [19]

Michail

[11] Patent Number: 5,772,227
[45] Date of Patent: Jun. 30, 1998

[54] ARTICULATED, FOLDING AND SECTIONAL BICYCLE WITH SPECIAL SUSPENSION SYSTEM

[76] Inventor: George Michail, 8, Karaoli+Dimitriou, 15125 Paradissos Amaroussiou, Greece

[21] Appl. No.: 602,829

[22] PCT Filed: Jun. 2, 1995

[86] PCT No.: PCT/GR95/00011

§ 371 Date: Jan. 26, 1996

§ 102(e) Date: Jan. 26, 1996

[87] PCT Pub. No.: WO95/33646

PCT Pub. Date: Dec. 14, 1995

[30] Foreign Application Priority Data

Jun. 6, 1994 [GR] Greece ................................ 940100271

[51] Int. Cl.[6] ............................. B62K 19/02; B62K 3/02
[52] U.S. Cl. .......................................... 280/275; 280/283
[58] Field of Search .................................... 280/274, 275, 280/281.1, 278, 283, 288.3, 288.1, 288.2

[56] References Cited

U.S. PATENT DOCUMENTS

| 3,301,575 | 1/1967 | Ryan et al. | 280/275 |
| 4,669,747 | 6/1987 | Groendal | 280/233 |
| 4,792,150 | 12/1988 | Groendal et al. | 280/275 |
| 5,080,384 | 1/1992 | Groendal et al. | 280/275 |
| 5,330,219 | 7/1994 | Groendal et al. | 280/283 |
| 5,356,165 | 10/1994 | Kulhawik et al. | 280/275 |
| 5,403,028 | 4/1995 | Trimble | 280/275 |
| 5,498,014 | 3/1996 | Kulhawik et al. | 280/275 |

*Primary Examiner*—Karen M. Young
*Assistant Examiner*—Gary Savitt
*Attorney, Agent, or Firm*—Herbert Dubno; Yuri Kateshov

[57] ABSTRACT

A folding bicycle is formed with a front frame and a rear frame connected rotatably with one another by a joint and capable of being completely separated and with a suspension system including a flexible element extending between a sprocket mounted on the second frame and the first frame and pretensioned by a spring which is engaged with the joint.

3 Claims, 1 Drawing Sheet

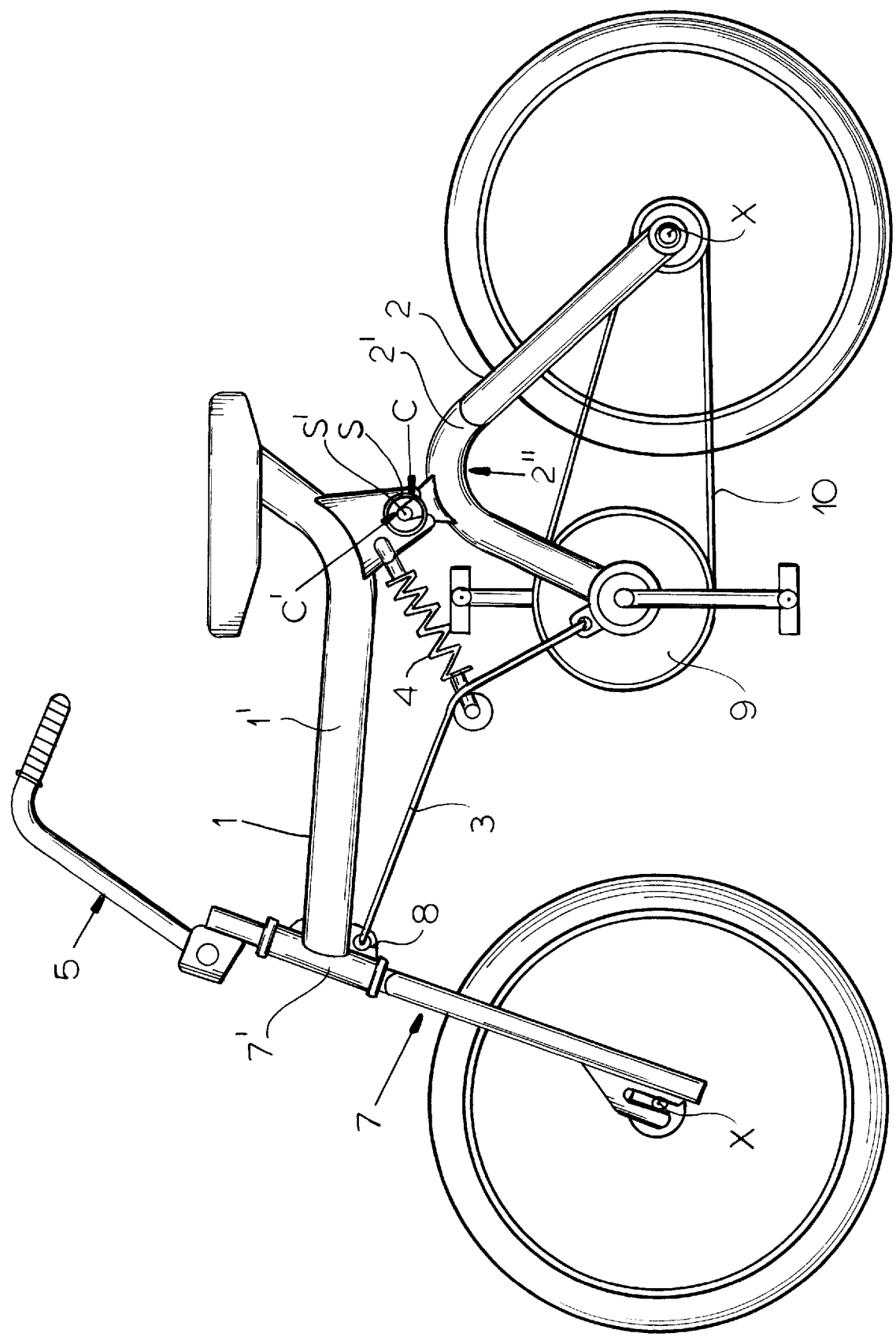

ARTICULATED, FOLDING AND SECTIONAL BICYCLE WITH SPECIAL SUSPENSION SYSTEM

CROSS REFERENCE TO RELATED APPLICATIONS

This application is a National Phase Application of PCT/GR95/00011 filed 2 Jun. 1995 and based, in turn, on Greek National Application filed 6 Jun. 1994 under the International Convention.

FIELD OF THE INVENTION

The present invention relates to a bicycle with two frame sections and a suspension system between the sections.

BACKGROUND OF THE INVENTION

Articulated, sectional and folding bicycles, and bicycles with a suspension system at the front and rear wheels are known in the marketplace.

However such bicycles are not entirely satisfactory because of complicated suspension systems as well as difficulty in folding or disassembling the bicycles.

OBJECTS OF THE INVENTION

It is therefore an object of the present invention to provide a bicycle having a unique suspension system.

SUMMARY OF THE INVENTION

This object is achieved by the structure of the folding bicycle according to the invention and including first and second frames mounted mutually rotatably about a joint as well as means for compensating impacts caused by irregularities of a terrain and mounted between the frames.

More particularly, the bicycle according to the invention has a front frame including the front wheel, the handle bar and the seat, and a rear frame with the rear wheel, cogged wheel, a pair of pedals and a transmission element. Further the structure has a joint between the frames and provided with bearings. An elastic suspension system includes an elastic element and a wire rope which engages both frames by the opposite ends of the elastic element.

BRIEF DESCRIPTION OF THE DRAWING

The above and other objects will become more readily apparent from the following description references being made to the accompanying drawing in which the sole FIGURE is a side elevational view of the bicycle according to the invention.

SPECIFIC DESCRIPTION

As can be seen from the FIGURE the bicycle according to the invention includes a front frame 1 and a rear frame 2. The frames are independent from each other and each is mounted on a respective front or rear wheel rotatable about parallel axle axes X. The frames are connected with each other by means of an articulation or joint S which has a joint axis S' extending parallel to the axle axes X. Thus either frame can be rotatable about the joint axis bringing thereby the bicycle in the folding position.

Besides the front wheel the front frame further includes a handle bar 5 provided with a fork 7 mounted by an upper end on the handle bar and, by a lower end, on the axle of the front wheel. The fork, in turn, is received in a cylinder 7' which is connected with an elongated bar frame 1' and is formed with an eye 8.

The rear frame 2 has generally an inverted V-shaped frame 2' with one of the arms mounted on a sprocket 9 which is provided with a pair of pedals and with the other arm engaged with an axle of the rear wheel. The sprocket and the rear axle is connected by a transmission chain 10.

A part 2" of the V-shaped frame bridging the arms is mounted on the joint S provided with means for complete disassembling of the bicycle or, if such disassembly is not required, the frames can be rotatable about a fulcrum C to bring the bicycle in a folding condition. In particular, the joint is formed with bearings of which only one C' is seen in the drawing.

The sprocket 9 and the eye 8 are bridged by a flexible elongated element and, more particularly, by a wire rope 3. The element 3, in turn, is connected with the joint S by means of a tension element 4 which acts upon the flexible element by bending it. The tension element can be, for example, a tension spring. Thus a suspension system including the joint S, the tension spring and the elastic element provides the bicycle with the ability to eliminate the shock caused by the irregularities of a terrain at the end of the travel of the spring and the wire.

I claim:

1. A folding bicycle comprising:

a front frame provided with:
   an elongated front frame bar formed with opposite ends,
   steering means for driving the bicycle and connected with one end of the front frame bar and including a front wheel and a handle bar operatively connected with the front wheel, and
   a saddle spaced from the steering means and mounted on the other end of the front frame bar;

a rear frame provided with:
   a rear frame bar having opposite ends,
   a rear wheel on one of the ends of the rear bar,
   a sprocket on the other end of the rear frame bar, and
   driving means for driving the bicycle and including a pair of pedals and an endless transmission element running between the sprocket and the rear wheel; and suspension means for absorbing impacts produced by irregularities of a terrain and including
   a joint between the elongated bar and the rear bar and formed with bearings operatively connecting with the front and rear bars, so that said frames are articulated to one another and said joint,
   a flexible element having respective opposite ends thereof connected with said sprocket and said steering means, and
   tension means suspended between the joint and the flexible element for pretensioning the element thereby forming a bend therein between the opposite ends of the element to absorb the impact.

2. The bicycle defined in claim 1 wherein said flexible element is a wire rope.

3. The bicycle defined in claim 1 wherein said tension means includes a tension spring.

* * * * *